United States Patent [19]
Flaim

[11] Patent Number: 5,950,670
[45] Date of Patent: Sep. 14, 1999

[54] VACUUM CUP SAFETY DEVICE

[75] Inventor: Richard A. Flaim, Taylor, Mich.

[73] Assignee: Rayco Manufacturing Inc., Rochester Hills, Mich.

[21] Appl. No.: 08/760,993

[22] Filed: Dec. 5, 1996

[51] Int. Cl.$^6$ .............................. F16K 17/26; F16K 15/00
[52] U.S. Cl. .................................... 137/493.8; 137/515.7; 137/539
[58] Field of Search ................. 137/539, 493.8, 137/515.7; 251/368

[56] References Cited

U.S. PATENT DOCUMENTS

| | | | |
|---|---|---|---|
| 2,312,432 | 3/1943 | Mercier | 91/447 |
| 2,501,305 | 3/1950 | Bennett | 137/493.8 |
| 2,896,663 | 7/1959 | Mena | 137/539 |
| 3,227,093 | 1/1966 | Taplin | 417/571 |
| 3,250,225 | 5/1966 | Taplin | 417/571 |
| 3,335,750 | 8/1967 | Kepner | 137/539 |
| 3,373,694 | 3/1968 | Taplin | 417/571 |
| 3,558,093 | 1/1971 | Bok . | |
| 3,602,543 | 8/1971 | Sjodin . | |
| 3,649,069 | 3/1972 | Zip . | |
| 3,716,307 | 2/1973 | Hansen . | |
| 3,907,268 | 9/1975 | Hale . | |
| 4,058,281 | 11/1977 | Albert . | |
| 4,174,081 | 11/1979 | Sardanowsky . | |
| 4,195,552 | 4/1980 | Neff | 91/447 |
| 4,196,882 | 4/1980 | Rognon . | |
| 4,197,875 | 4/1980 | Schieferstein et al. | 137/539 |
| 4,221,356 | 9/1980 | Fortune . | |
| 4,650,233 | 3/1987 | Mang et al. . | |
| 4,708,381 | 11/1987 | Lundback . | |
| 4,718,629 | 1/1988 | Block et al. . | |
| 5,048,804 | 9/1991 | Ito . | |
| 5,177,857 | 1/1993 | Ito . | |
| 5,181,691 | 1/1993 | Taniguchi et al. | 251/368 |
| 5,183,068 | 2/1993 | Prosser | 251/368 |
| 5,263,760 | 11/1993 | Sohol . | |
| 5,327,932 | 7/1994 | Rozek | 417/571 |
| 5,374,167 | 12/1994 | Merbold | 137/539 |
| 5,378,229 | 1/1995 | Layer et al. | 137/512 |
| 5,381,990 | 1/1995 | Belokin et al. . | |
| 5,451,086 | 9/1995 | Pazzaglia . | |
| 5,511,752 | 4/1996 | Trethewey . | |
| 5,518,027 | 5/1996 | Siki et al. | 251/368 |
| 5,655,503 | 8/1997 | Kampichler et al. | 417/571 |

*Primary Examiner*—Henry Bennett
*Assistant Examiner*—Joanne Y. Kim
*Attorney, Agent, or Firm*—Young & Basile, P.C.

[57] ABSTRACT

A vacuum cup safety device selectively maintains pressure within a vacuum cup for an extended period of time until release of the vacuum is desired. The device includes a housing having first and second apertures extending through a first portion of the housing and in communication with a third aperture extending through a second portion of the housing. First and second seals are positionable within first and second apertures, and extend radially inwardly within the first and second apertures a predetermined distance for defining first and second check valve seats. First and second check valves composed of a hard, polished material are provided within the first and second apertures. Each of the first and second check valves is insertable within the respective aperture of the housing and is reciprocally movable therein between a first position seated with respect to the corresponding check valve seat and a second position longitudinally spaced from the corresponding check valve seat. First and second biasing springs are disposed within the respective first and second apertures for biasing the first and second check valves toward the first position. A lubricating film can coat the first and second check valves for reducing friction with respect to the housing and improving sealing characteristics as the first and second check valves move between the first and second positions.

20 Claims, 2 Drawing Sheets

5,950,670

VACUUM CUP SAFETY DEVICE

FIELD OF THE INVENTION

The present invention relates to a vacuum cup safety device for maintaining vacuum pressure within a vacuum cup until released to provide a fail-safe condition in the event of the loss of suction pressure.

BACKGROUND OF THE INVENTION

Vacuum cup systems have been in use for lifting glass and metal plates, or other industrial parts having nonporous surface. In the event that the source of vacuum pressure is lost, the grip of the vacuum cups on the workpieces being lifted and moved can be lost resulting in potential damage to surrounding equipment, or injury to operating personnel. Therefore, it is desirable in the present invention to provide a safety device that can maintain the vacuum pressure within a vacuum cup after the failure of the source of vacuum until positively released.

SUMMARY OF THE INVENTION

It is desirable in the present invention to provide a vacuum cup safety device that can maintain vacuum pressure within a vacuum cup over an extended period of time even in the absence of a source of vacuum pressure, once sufficient vacuum has been achieved within the vacuum cup. In other words, the vacuum cup safety device according to the present invention can isolate the vacuum cup and maintain a grip on a workpiece independent of the condition of the source of vacuum pressure used to initially grip the workpiece with the vacuum cup. It is desirable in the present invention to provide a vacuum cup safety device that can maintain a holding condition for an extended period of time, and for at least 20 minutes, and preferably longer.

A vacuum cup safety device according to the present invention selectively maintains pressure within a vacuum cup until selectively released. The vacuum cup safety device includes a housing having first and second apertures extending through a first portion of the housing and in communication with a third aperture extending through a second portion of the housing. Seal means is positioned within the first and second apertures and extends radially inwardly within the first and second apertures a predetermined distance to define a first check valve seat. Check valve means, composed of a hard, polished material, is insertable within the first and second aperture of the housing and reciprocally movable therein between a first position seated with respect to the corresponding check valve seat and a second position longitudinally spaced from the corresponding check valve seat. Biasing means is disposed within the first and second apertures for biasing the check valve means toward the first position. Preferably, lubricating means is provided coating the check valve means for reducing friction between the check valve means and the housing. The first and second portions of the housing are preferably separable with respect to one another along a parting line defined by first and second opposed surfaces on the first and second housing portions respectively.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
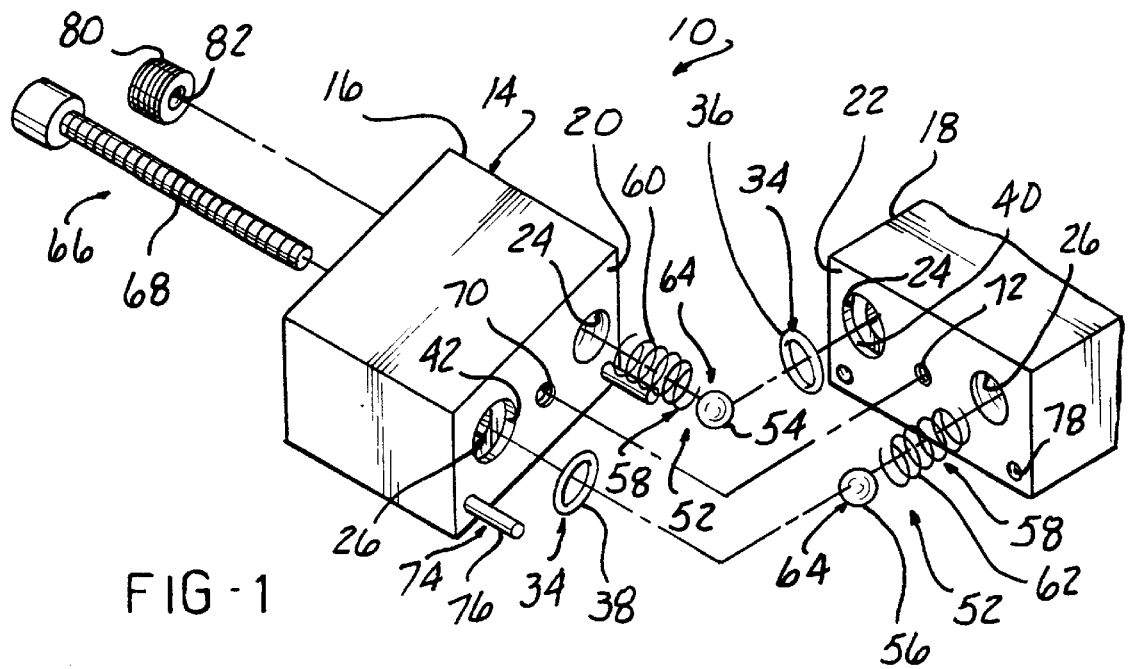
FIG. 1 is an exploded perspective view of a vacuum cup safety device according to the present invention.
Figure 2:
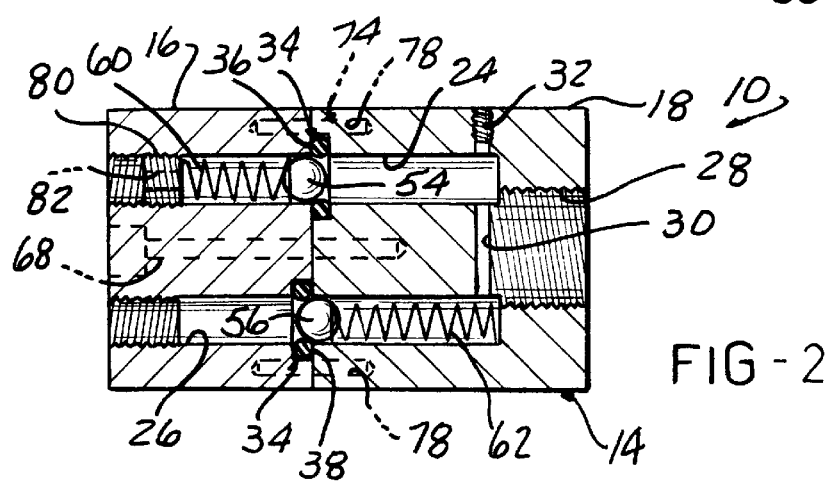
FIG. 2 is a cross sectional view of the vacuum cup safety device according to the present invention.

A vacuum cup safety device 10 according to the present invention selectively maintains vacuum pressure within a vacuum cup 12 until a point in time when release of the vacuum pressure is desired. The vacuum cup safety device 10 includes a housing 14 having a first portion 16 and a second portion 18 separable from one another along a parting line defined by first and second opposed surfaces 20 and 22 respectively. The housing 14 includes first and second apertures 24 and 26 extending through the first and second opposed surfaces 20 and 22 defining the parting line. The housing 14 also includes a third aperture 28 extending into the second portion 18 and in communication with the first and second aperture 24 and 26, such as through cross bore 30 formed in the housing 14. The cross bore 30 can be sealed with a suitable plug 32 as is conventional.

Seal means 34 surrounds the first and second apertures 24 and 26 and extends radially inwardly within the first and second aperture a predetermined distance for defining a first check valve seat 36 and a second check valve seat 38. Preferably, the seal means 34 is interposed between the first and second opposed surfaces 20 and 22 defining the parting line of the housing 14. Seal-receiving apertures 40 and 42 can be formed in the first and second opposed surfaces 20 and 22 for retaining the seal means 34 in position when the first and second portion 16 and 18 of the housing 14 are assembled with respect to one another. Preferably, the first seal-receiving aperture 40 is associated with the first aperture 24 and is formed in the second opposed surface 22 of the second portion of the housing 14, while the second seal-receiving aperture 42 is associated with the second aperture 26 and is formed in the first surface 20 of the first portion 16 of the housing 14. As illustrated in the drawings, the first aperture 24 is connectible to a source of vacuum, such as that supplied by vacuum pump 44, while the second aperture 26 is connectible to a source of pressurized fluid 46, such as compressed air. The third aperture 28 is connectible to a suction cup 12 for selectively engaging and releasably gripping a workpiece or part 48 having a relatively smooth nonporous surface 50. Preferably, the seal means 34 includes a first seal defining the first check valve seat 36 and a second seal defining the second check valve seat 38. Preferably, the first and second seals 36 and 38 are composed of natural rubber material. The natural rubber material has a Durometer hardness of 40 to 90 and an operating temperature range of minus 75° Fahrenheit to 200° Fahrenheit. It is believed that material with operating characteristics of Durometer hardness between 30 to 100, more preferably 40 to 90, and most preferably 60 to 75, such as the materials listed in the following table would be suitable substitutes for the natural rubber seals.

| MATERIAL | HARDNESS (DUROMETER) | TEMPERATURE RANGE (° F.) |
|---|---|---|
| NATURAL RUBBER | 40 TO 90 | −75° F. TO 200° F. |
| NITRILE (BUNA N) | 50 TO 100 | −40° F. TO 250° F. |
| NEOPRENE | 40 TO 90 | −55° F. TO 250° F. |
| BUTYL | 50 TO 80 | −75° F. TO 300° F. |
| SBR | 40 TO 90 | −70° F. TO 225° F. |
| HYDRIN | 60 TO 90 | −75° F. TO 300° F. |
| HYPALON | 50 TO 85 | −55° F. TO 275° F. |
| VITON | 60 TO 90 | −20° F. TO 500° F. |
| SILICONE | 30 TO 80 | −120° F. TO 550° F. |
| ETHYLENE PROPYLENE | 50 TO 90 | −65° F. TO 350° F. |

Check valve means 52 is insertable within the first and second apertures 24 and 26 of the housing 14, and is reciprocally movable therein between a first position seated with respect to the corresponding check valve seat 36 and 38, and a second position longitudinally spaced from the corresponding check valve seat 36 and 38. Preferably, the check valve means 52 includes first and second balls 54 and 56, where the first check ball is engageable within the first aperture 24 and the second check ball 56 is engageable within the second aperture 26. Preferably, the first and second balls 54 and 56 are made of a hard, polished material. Preferably, the balls 54 and 56 have a 10K polish surface finish. Preferably, the first and second balls 54 and 56 are composed of ceramic material and are polished to high degree of smoothness, such as a 10K polish surface finish. It is believed that suitable material substitutes for the check balls 54 and 56 would includes non-ferrous, ferrous, carbide and synthetic materials. The non-ferrous material can be selected from a group including aluminum, aluminum bronze, brass, copper, stainless steal and titanium. The ferrous material can be selected from a group including cobalt alloys, chrome steel, inconel, monels, M-50 and tool steels. The carbide material can be selected from a group including silicone carbide, tantalum and tungsten carbide. The synthetic materials can be selected from a group including ceramic, glass, plastic and sapphire. Other materials believed to be acceptable are Hastelloy C, K-monel, nylon, delain, ruby sapphire, 316 type stainless steel, carpenter 20 stainless steel, Monel 400, Hastelloy alloys, zirconia, silicon nitride and aluminum alloys material. In selecting the material for the check ball, it is desirable to select a material that is hard, strong, and relatively impervious to degradation due to moisture, such as the result of rusting. In this respect, it is recognized that chrome has a relatively short life due to problems with rust, and steel may have an acceptable life, but is also subject to rusting over time. Glass, while considered a suitable substitute, may be too fragile for certain applications. The preferred material for the check ball, as previously indicated, is a ceramic ball having a 10K polish surface finish. It has been found that over time contaminants can coat the surface of the check ball and as a result the device may require some regular maintenance, such as on a two year schedule for cleaning, testing and replacement of any parts that have deteriorated due to the operating environment. It has been found that the combination of the ceramic ball having a highly polished surface in combination with rubber seals provides superior sealing characteristics for vacuum cup safety devices. The split housing 14 allows placement of the rubber seals along the opposing surfaces of the parting line to capture the seals within the seal seats and to hold the seals in place after assembly of the split housing 14.

Biasing means 58 is disposed within the first and second apertures 24 and 26 for biasing the check valve means 52 toward the first position. Preferably, the biasing means 58 includes a first spring 60 engageable within the first aperture 24 for biasing the first ball 54 toward the first position in sealing engagement with the first check valve seat 36, and a second spring 62 engageable within the second aperture 26 for biasing the second ball 56 toward the first position in sealing engagement with the second check valve seat 38. A spring seat for the first spring 60 can be provided by a threaded member 80 engaged within a threaded portion of the first aperture 24 and having an aperture 82 extending therethrough.

Preferably, lubricating means 64 coats the check valve means 52 for reducing friction between the check valve means 52 and the housing 14. It has been found that a suitable lubricating material is commercially available under the trade name ACCROLUBE grease with TEFLON from ACCRO-SEAL, a Kalplas Company of Vicksburg, Mich. The lubricating material can be applied to the check balls 54 and 56 to provide a protective and lubricating film. Preferably, the lubricating material is virtually unaffected by corrosive moisture and is not subject to migration as a result of temperature differences of the surfaces to be lubricated. The preferred lubrication material does not lose consistency in the presence of water, does not turn hard, crack or peel from an applied surface and leaves a protective coating that remains in service even if the petroleum grease is wiped away. It is believed that micro particles of fluorocarbon resin in petroleum grease, such as the ACCROLUBE material provide suitable operating characteristics. The preferred lubricating material may include molybdenum disulfide, Teflon and graphite. It is believed that the lubricating means 64 increases the sealing efficiency of the combination of the ceramic check ball and natural rubber seal.

The vacuum cup safety device 10 according to the present invention can also include fastener means 66 for holding the first and second portions 16 and 18 of the housing 14 in an assembled condition. The fastener means 66 can include a threaded bolt 68 engageable through an aperture 70 formed in the first portion 16 of the housing 14 for threaded engagement with a threaded coaxial aperture 72 for releasably holding the first portion 16 with respect to the second portion 18 of the housing 14. If only a single bolt 68 is provided, guide pin means 74 can be provided for aligning the first and second portions 16 and 18 with respect to one another during assembly. The guide pin means 74 can include at least one guide pin 76 and corresponding pin-receiving aperture 78.

Figure 3:
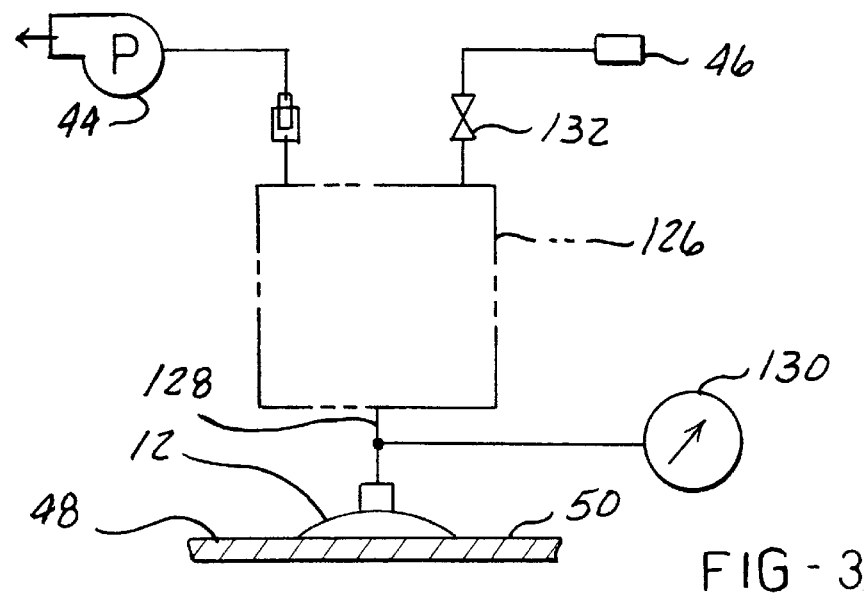
FIG. 3 is a schematic view of a test configuration used to compare operating characteristics of the present invention with respect to the operating characteristics provided by a prior art vacuum cup safety device.
Figure 4:
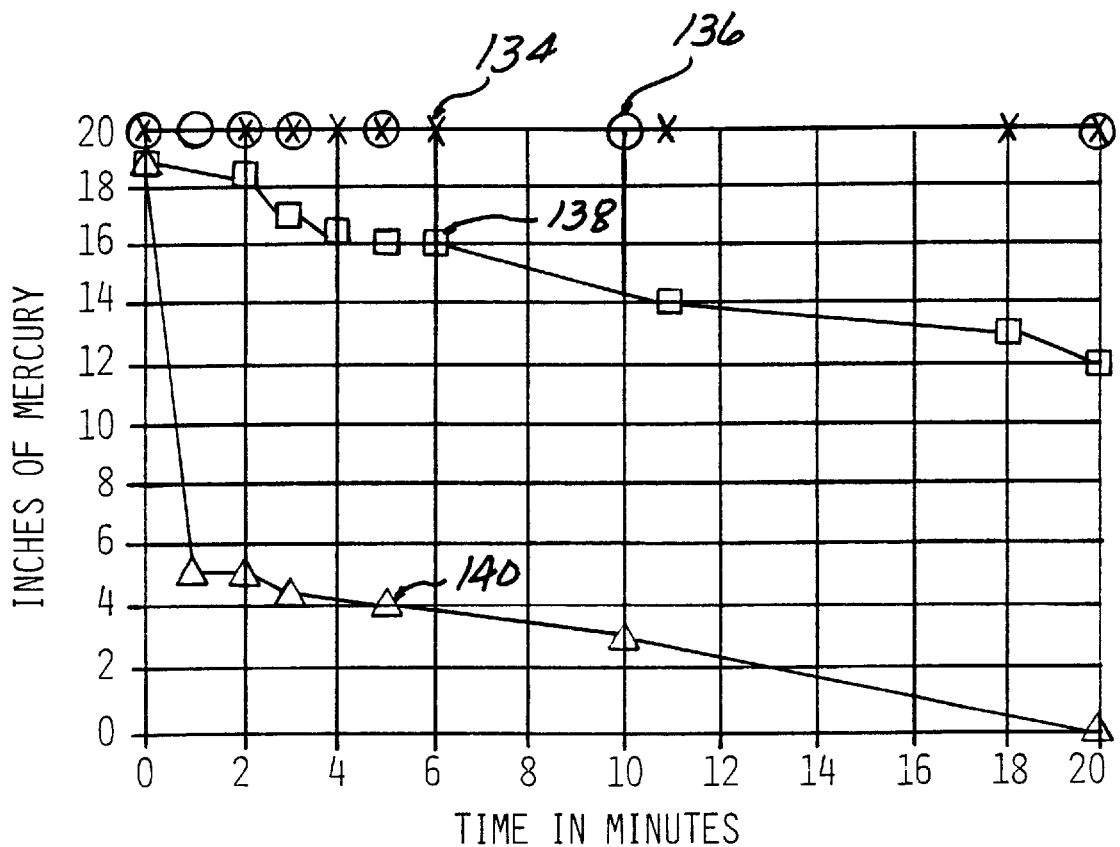
FIG. 4 is a graph illustrating the results of the tests run on the vacuum cup safety device using the test configuration illustrated in FIG. 3.
Figure 5:
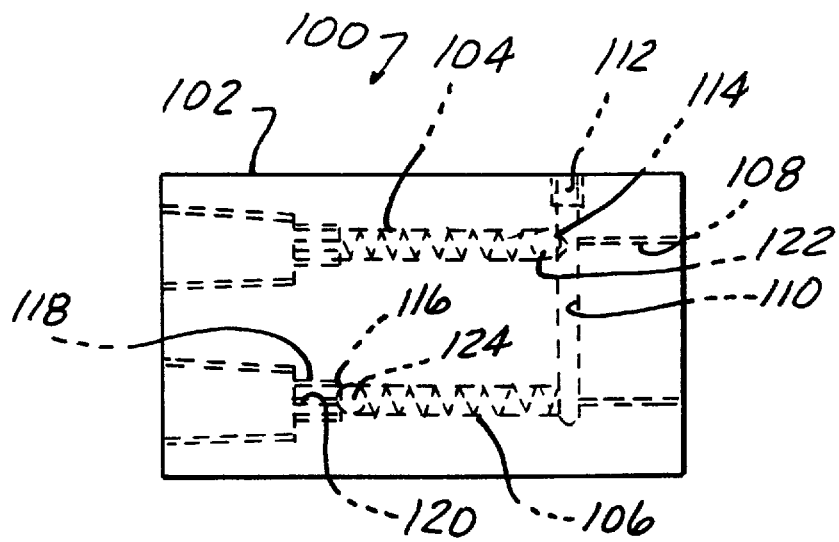
FIG. 5 is a plan view of the prior art vacuum cup safety device used in the test configuration illustrated in FIG. 3 to obtain the comparison data illustrated in FIG. 4.

Referring now to FIGS. 3–5, a test configuration was assembled according to the schematic diagram of FIG. 3 to compare the vacuum holding characteristics of the present vacuum cup safety device 10 with a prior known device 100 as illustrated in FIG. 5. The prior device 100 included a monolithic, unitary, one-piece housing 102 having a first aperture 104 and a second aperture 106 extending therethrough in communication with a third aperture 108, such as through cross bore 110. The cross bore 110 was sealed with a plug 112 as is conventional. A first valve seat 114 is formed adjacent one end the first apertures 104, and a second valve seat is formed adjacent an end of the second aperture 106 formed on one end of a threaded member 118 having a through bore 120. The check balls 122 and 124 disposed within the first and second aperture 104 and 106 respectively are made of rubber or neoprene to act in a self sealing manner with respect to the corresponding valve seats 114 and 116.

Two of the prior known devices 100 and two of the vacuum cup safety devices 10 according to the present invention were installed in the test configuration as schematically illustrated in FIG. 3 at the position 126 shown in phantom. Each device was connected to the vacuum cup 12 through a T-shaped connector 128 providing a tap for vacuum pressure gauge 130 to monitor the vacuum pressure maintained within the vacuum cup by the various devices during the test procedure. The first aperture of each device was connected to a source of vacuum, such as suction pump 44 through a quick connect or while the second aperture of each device was connected to a source of pressurized air 46 through a shut off valve 132. The results of the test are set forth the following table and illustrated in the attached graph of FIG. 4.

| TIME (MINUTES) | VACUUM (INCHES OF MERCURY) | VACUUM (INCHES OF MERCURY) |
|---|---|---|
| | RAYCO VAC TRAP #1 (SYMBOL "X") | PRIOR ART PART #1 (SYMBOL "□") |
| START | 20 | 19.0 |
| 2 | 20 | 10.5 |
| 3 | 20 | 17.0 |
| 4 | 20 | 16.5 |
| 5 | 20 | 16.0 |
| 6 | 20 | 16.0 |
| 11 | 20 | 14.0 |
| 18 | 20 | 13.0 |
| 20 | 20 | 12.0 |
| | RAYCO VAC TRAP #2 (SYMBOL "O") | PRIOR ART PART #2 (SYMBOL "Δ") |
| START | 20 | 19.0 |
| 1 | 20 | 5.0 |
| 2 | 20 | 5.0 |
| 3 | 20 | 4.5 |
| 5 | 20 | 4.0 |
| 10 | 20 | 4.0 |
| 20 | 20 | 3.0 |
| 30 | 20 | 1.0 |
| 60 | 20 | 1.0 |
| 120 | 20 | 1.0 |
| 240 | 20 | 1.0 |
| 1440 | 20 | 0.0 |

The vacuum cup safety device 10 according to the present invention is graphically illustrated in FIG. 4 for the first part using symbol "X" and 136 for the second part using symbol "O". As can be seen from the graph and the data in the attached table, the vacuum cup safety device 10 according to the present invention maintained the starting value of 20 inches of mercury for at least 20 minutes in the first test and for at least 24 hours in the second test. In comparison, the results of the prior art device 100 is graphically illustrated in FIG. 4 using symbol "□" for the first part and symbol "Δ" for the second part. Using the same physical piping configuration vacuum pump and suction cup, it was impossible to achieve the desired start vacuum pressure of 20 inches of mercury, and in each case the prior art device test was begun at 19 inches of mercury vacuum pressure. In each case of the prior art device 100, the vacuum pressure maintained in the vacuum cup dropped significantly over the 20 minute time period as shown in the graph and in the data table above. The first prior art device 100 resulted in the graph line 138, while the second prior art device 100 resulted in the graph line 140 illustrated in FIG. 4.

The present invention is a vacuum check valve safety device that includes a blow off check valve in a single self contained unit. Preferably, the present invention uses a ceramic ball, such as that commercially available from Industrial Tectonics Inc. of Dexter, Mich. to seal with respect to an O-ring to hold vacuum in a vacuum cup system if the source of the generated vacuum has been lost. The purpose of the blow off check valve is to release the vacuum after the desired task has been completed. The present invention demonstrates a superior sealing performance when compared to a prior known device currently on the market, by holding the vacuum within the vacuum cup for an appreciably longer period time then that provided by the prior known device. The present invention is also more economical then using a series of pneumatic valves to trap the vacuum in the system.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vacuum cup safety device for maintaining pressure within a vacuum cup until released comprising:

a housing having a first portion and a second portion separable from one another along a parting line defined by first and second opposed surfaces respectively, said housing including first and second apertures extending through the first portion and into the second portion passing through the first and second opposed surfaces of the parting line, said housing including a third aperture extending into the second portion and in communication with the first and second apertures;

seal means separable from said housing and interposed between said first and second opposed surfaces to surround said first and second apertures and extend radially inward within said first and second apertures a predetermined distance for defining a first check valve seat and a second check valve seat;

check valve means insertable within said first and second apertures of said housing and reciprocally moveable therein rectilinearly between a first position seated with respect to said corresponding check valve seat and a second position longitudinally spaced from said corresponding check valve seat, said check valve means including at least one solid rectilinearly reciprocal valve member for each aperture; and biasing means disposed within said first and second apertures for biasing said check valve means toward said first position.

2. The vacuum cup safety device of claim 1 further comprising:

lubricating means, coating said check valve means, for reducing friction between said check valve means and said housing.

3. The vacuum cup safety device of claim 1 further comprising:

said check valve means including a first ball engageable within said first aperture and a second ball engageable within said second aperture.

4. The vacuum cup safety device of claim 3 further comprising:

said first and second balls composed of ceramic material.

5. The vacuum cup safety device of claim 4 further comprising:

said first and second ceramic balls polished to a high degree of smoothness.

6. The vacuum cup safety device of claim 1 further comprising:

said seal means including a first seal and a second seal encircling said first and second apertures respectively.

7. The vacuum cup safety device of claim 6 further comprising:

said first and second seals composed of a rubber material.

8. The vacuum cup safety device of claim 1 further comprising:

said biasing means including a first spring and a second spring engageable within said first and second apertures respectively.

9. The vacuum cup safety device of claim 1 further comprising:

guide pin means for aligning said first and second portions of said housing with respect to one another during assembly; and fastener means for holding said first and second portions of said housing in an assembled condition.

10. A vacuum cup safety device for maintaining pressure within a vacuum cup until released comprising:

a housing having first and second apertures extending through a first portion of the housing and in communication with a third aperture extending through a second portion of the housing;

seal means separable from said housing and positionable within said first and second apertures and extending radially inward within said first and second apertures a predetermined distance for defining a first check valve seat and a second check valve seat;

check valve means composed of a hard, polished material, said check valve means insertable within said first and second apertures of said housing and reciprocally moveable therein rectilinearly between a first position seated with respect to said corresponding check valve seat and a second position longitudinally spaced from said corresponding check valve seat; and biasing means disposed within said first and second apertures for biasing said check valve means toward said first position.

11. The vacuum cup safety device of claim 10 further comprising:

lubricating means, coating said check valve means, for reducing friction between said check valve means and said housing.

12. The vacuum cup safety device of claim 10 further comprising:

said check valve means including a first ball engageable within said first aperture and a second ball engageable within said second aperture.

13. The vacuum cup safety device of claim 12 further comprising:

said first and second balls composed of a material selected from the group of ceramic , aluminum, aluminum bronze, brass, copper, stainless steel, titanium, silicon carbide, tantalum, tungsten carbide, cobalt alloys, chrome steel, inconel, monel, M-50, tool steel, glass, plastic, sapphire, Hastelloy C, K-monel, nylon, delain, ruby sapphire, 316 type stainless steel, carpenter 20 stainless steel, Monel 400, Hastelloy alloys, zirconia, silicon nitride and aluminum alloys material.

14. The vacuum cup safety device of claim 13 further comprising:

said first and second balls polished to a high degree of smoothness.

15. The vacuum cup safety device of claim 10 further comprising:

said seal means including a first seal and a second seal encircling said first and second apertures respectively.

16. The vacuum cup safety device of claim 15 further comprising:

said first and second seals composed of a material selected from the group of natural rubber, nitrile (buna n), neoprene, butyl, SBR, hydrin, hypalon, viton, silicone, ethylene propylene, and teflon material.

17. The vacuum cup safety device of claim 10 further comprising:

said biasing means including a first spring and a second spring engageable within said first and second apertures respectively.

18. The vacuum cup safety device of claim 10 further comprising:

said first and second portions of said housing separable with respect to one another along a parting line defined by first and second opposing surfaces on said first and second housing portions respectively.

19. The vacuum cup safety device of claim 18 further comprising:

guide pin means for aligning said first and second portions of said housing with respect to one another during assembly; and fastener means for holding said first and second portions of said housing in an assembled condition.

20. A vacuum cup safety device for maintaining pressure within a vacuum cup until released comprising:

a housing having first and second apertures extending through a first portion of the housing and in communication with a third aperture extending through a second portion of the housing;

first and second seals separable from said housing and positionable within said first and second apertures and extending radially inward within said first and second apertures a predetermined distance for defining first and second check valve seats;

first and second check valves composed of a hard, polished material, each of said first and second check valves insertable within said respective first and second apertures of said housing and reciprocally moveable therein rectilinearly between a first position seated with respect to said corresponding check valve seat and a second position longitudinally spaced from said corresponding check valve seat;

first and second biasing means disposed within said respective first and second apertures for biasing said respective first and second check valves toward said first position; and a lubricating film coated on said first and second check valves for reducing friction with respect to said housing as said first and second check valves move between said first and second positions.

* * * * *